Patented Feb. 13, 1940

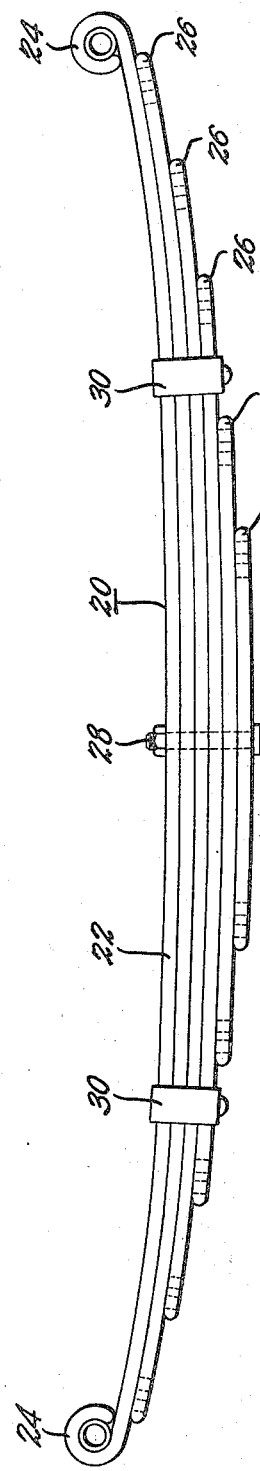
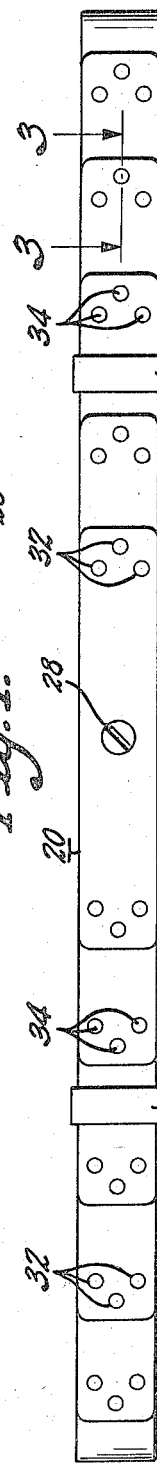
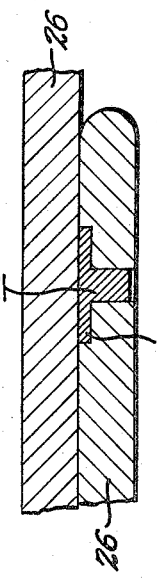
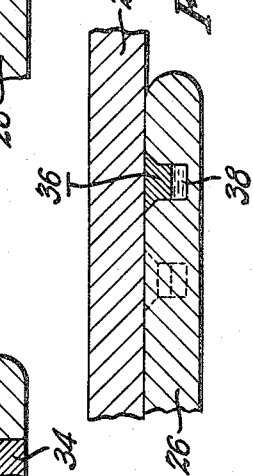
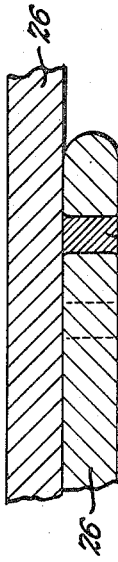

2,190,217

UNITED STATES PATENT OFFICE 2,190,217

LUBRICATING ELEMENT

Earl S. Patch, Dayton, Ohio, assignor to General Motors Corporation, Detroit, Mich., a corporation of Delaware Application October 23, 1937, Serial No. 170,527

5 Claims. (Cl. 267—50)

This invention relates to relatively movable, self-lubricating plates or members and more particularly to a laminated leaf spring construction that is self-lubricating.

In leaf spring constructions it is the usual practice to form the individual leaves so that when they are assembled the main compressive load from one leaf to the next is carried adjacent the ends of the leaves. For this reason it is desirable to provide lubrication at the surfaces of the leaves adjacent the ends thereof to lessen friction and wear therebetween and also to reduce unnecessary noise during the action of the spring.

In the past, such lubrication has been accomplished in a number of ways, such as providing wear plates having self-lubricating properties, which plates are interposed between the laminations of a leaf spring assembly adjacent the ends thereof and which plates therefore carry the full compressive load present adjacent the end of the associated spring leaf. Such a structure is shown in my Patent No. 2,051,458 filed July 21, 1933 and granted August 18, 1936.

I am also aware of spring constructions wherein one or more buttons of metal having self-lubricating properties have been interposed between the laminations of a leaf spring assembly. In this construction the entire compressive load is again carried by the button or buttons.

Since metal having self-lubricating properties is porous, it is desirable to reduce a compressive load thereon when assembled in a leaf spring structure. This is desirable for several reasons, first the lubricating qualities of the metal are greatly enhanced by a high degree of porosity thereof since such metal can contain more oil or other lubricant per cubic inch. It is apparent that as the degree of porosity is increased that the compressive strength of the metal is correspondingly decreased, therefore in the prior structures herein noted it was necessary to use a self-lubricating metal that did not have a high degree of porosity in order to obtain a sufficient compressive strength to withstand the conditions under which the metal was used. Thus in the prior use of such metals the percentage of oil impregnation was low and the self-lubricating properties were limited and therefore it was necessary to use a relatively large area of such metal in order to obtain satisfactory lubrication. Second, the porous metal has a tendency to burnish at the surface thereof when in rubbing engagement with a harder surface. Such burnishing action tends to close the pores at the rubbing surface of the metal and thereby reduce the lubricating qualities of the metal. Here again large areas of metal are required in order to obtain satisfactory lubrication.

The present invention is an improvement over the prior uses of porous metal in spring assemblies and contemplates the use of a highly porous metal impregnated with lubricant. In the present invention very small areas of porous metal surfaces, preferably porous bronze, are exposed to the adjacent leaf spring. Such porous metal has a high degree of porosity and a high percentage of lubricant impregnation. The previous difficulties have been obviated by insetting the porous metal plugs or buttons in the spring leaf so that the surface of the porous metal is substantially flush with the surface of the spring. Thus, the porous metal carries only a part of the compressive load on the spring proportional to the area of the porous metal and the area of the rubbing surface of the spring. Since the compressive load is reduced, the burnishing action is lessened considerably and more specifically the porosity of the metal can be increased considerably so that a high degree of lubricant impregnation can be obtained. As a direct result, the size of the plugs or buttons can be reduced, since a reduced size of button due to the increased porosity thereof carries an equivalent quantity of lubricant as was carried in the larger wear plates of the prior art that were relatively dense in structure when compared with the present porous metal button.

It is therefore an object of the present invention to provide two relatively movable members disposed in rubbing engagement to each other with one or more porous metal plugs inset in the surface of one of the members and substantially flush with said surface so that the plug or plugs only carry their share of the compressive load between the members in proportion to the relative areas of the plug or plugs and the rubbing surface of the member in which they are inset.

It is a further object of the present invention to provide a laminated leaf spring construction with plugs having self-lubricating properties adjacent the end of each of the leaves of the spring and substantially flush with the surfaces of the leaf and thereby lubricate the spring. In carrying out the above object it is a further object, in some instances to rivet the plug to the spring so that the plug has a flush bearing surface at either end thereof and therefore can be used to lubricate the next lower and the next higher spring.

It is a still further object to form recesses in one of the spring plates, which recesses are filled with lubricant and then closed by a porous metal plug which is pressed therein so as to be substantially flush with the surface of the plate, said lubricant seeping through the porous metal by capillary action to provide lubrication at the surface thereof.

Further objects and advantages of the present invention will be apparent from the following description, reference being had to the accompanying drawing wherein a preferred embodiment of of the present invention is clearly shown.

In the drawing:

Fig. 1 shows a side view of a conventional leaf spring assembly, including plugs of self-lubricating metal.

Fig. 2 is a bottom view of the spring shown in Fig. 1.

Fig. 3 is an enlarged fragmentary view, in section, of two of the spring leaves showing the lubricating plugs riveted in place on one of the leaves.

Fig. 4 is a view similar to Fig. 3 showing another form of plug utilizing a lubricant reservoir, and Fig. 5 is a view similar to Fig. 3 showing still another form of self-lubricating plug.

Referring to Fig. 1, a conventional type of leaf spring assembly 20 is shown comprising a main leaf 22 having an eye portion 24 on either end thereof adapted to be associated with suitable spring hangers. A plurality of leaves 26 are associated with the main leaf 22 and are of graduated lengths. The leaves 26 are tightly bolted to the main leaf 22 by a bolt 28 passing through the central portion of all of the leaves. Two straps or clips 30, riveted or otherwise secured to one of the leaves and spaced approximately equi-distant between the center of the leaf spring assembly and the eye portions 24 of the main leaf are provided to further hold the spring leaves together and more particularly to maintain alignment thereof. Each of the leaves 26 is drilled adjacent either end thereof to provide three holes 32 therein. In the present embodiment the holes 32 extend completely through the leaves 26. Porous metal plugs 34 having a head portion at one end thereof are pressed within the holes 32 and are headed at the opposite end thereof to rivet the same in place. Preferably the holes 32 are suitably chamfered at either end thereof so that the plugs 34, when riveted in place, are substantially flush with the surface of the spring leaf 26.

The porous metal plugs 34 are preferably formed from porous bronze material but also may be formed from porous copper, nickel or iron alloys or any other suitable porous material. Plugs 34 are impregnated with oil, or other lubricant, prior to being riveted in place in the spring leaves. Thus when the spring 20 is assembled, the porous metal plugs 34 are in rubbing engagement with the next longer spring leaf and oil which seeps out of the plug due to capillary action lubricates the leaves adjacent the ends thereof. In this manner satisfactory lubrication of a laminated leaf spring 20 is effected and maintained for long periods of operation.

The plugs 34 being fabricated from metal having a high degree of porosity are capable of containing lubricant up to 30% or more by volume, and therefore, may be of relatively small diameter. These small diameter plugs do not tend to weaken the spring appreciably as they are positioned adjacent the ends of the leaves. It is apparent that fewer plugs may be used, for example, one, if the size thereof is increased slightly. Porous metal such as the porous bronze used in the aforementioned plugs can be fabricated by several methods, one of which is disclosed in a patent to Williams et al. 1,642,347, filed August 17, 1922.

The modification shown in Fig. 4 is provided to include porous metal plugs 36 which are preferably press-fitted into recesses 38 in the spring leaves. The height of a plug 36 is not as great as the depth of a recess 38 and therefore lubricant may first be placed in the recess and then the plug pressed in place. Thus each plug 36 is provided with a small reservoir of lubricant which due to the porous nature of the plug slowly seeps therethrough to lubricate the surface of the plug and thereby lubricate the surface between the spring leaves.

Fig. 5 shows still another embodiment of the present invention wherein a plug 40 is employed which has a shoulder portion 42 thereon. The plug 40 is pressed into a counterbored hole within the spring leaf so that the shoulder portion 42 is substantially flush with the surface of the spring leaf. In this embodiment the plug 40 is not riveted in place but is maintained in position by the adjacent spring leaf which bears thereon. In this modification a larger lubricating surface is provided.

It will be noted that in all of the embodiments shown herein that the lubricating surface of the porous metal plug is substantially flush with the surface of the associated spring leaf. In this manner the porous metal is only subjected to that portion of the compressive load upon the leaf as determined at the relative areas of the plug surface and the rubbing surface of the spring leaf.

It is to be understood that while the present disclosure is directed, namely, to the lubrication of the leaf spring assemblies that the principle thereof can be applied to any two relatively moving surfaces that are in rubbing engagement with one another. It is therefore within the scope of the present invention to lubricate any two rubbing surfaces wherein the self-lubricating porous metal plugs are substantially flush with one of the surfaces and are only subjected to a proportional part of the compressive load carried by the surface as determined by the relative areas of the surface and the porous metal part.

It is apparent that in some instances the porous metal plug need not rub against the engaging surface but may be out of engagement therewith, as for example, when the plug carrying member is disposed above the other member. In this case lubricant seeping out of the plug will flow by gravity to the rubbing surfaces. Obviously, the plug should be substantially flush with the surface of the member carrying the same but does not necessarily have to be disposed so as to actually rub on the other member.

While the embodiments of the present invention as herein disclosed, constitute preferred forms, it is to be understood that other forms might be adopted, all coming within the scope of the claims which follow.

What is claimed is as follows:

1. A laminated spring, comprising a plurality of superimposed spring plates of graduated lengths and provided with recesses near the ends thereof; a plurality of porous metal, oil impregnated plugs disposed in said recesses and riveted at either side of the spring plates, the surfaces of said plugs being substantially flush with the surfaces of the spring plates whereby the plugs only carry their proportional share of the compressive load on said plates as determined by the relative areas of the plugs on the plates.

2. A laminated spring, comprising a plurality of superimposed spring plates of graduated lengths; a plurality of porous bronze oil impregnated plugs extending through and riveted to said spring plates and disposed with their rubbing surfaces flush with the surfaces of the respective spring plate, said plugs only carrying a proportional share of the compressive load as determined by the relative areas of the plugs and the plates.

3. In combination, two superimposed plates adapted to be engageable and relatively movable with respect to each other; a plurality of recesses in one of said plates; a plurality of porous metal lubricant impregnated plugs riveted in said recesses so that the outer surfaces of the plugs are flush with the engaging surface of said plate, whereby the engaging surfaces of the plates are lubricated and the plugs are only subjected to that portion of the compressive load on said plate as determined by the relative areas of the plate and the plugs.

4. In combination, two relatively movable members disposed in rubbing contact with one another, a porous metal plug passing through one of said members, said plug having a head portion disposed to lie flush with one surface of the said member and being adapted to be riveted over at the other end thereof so as to be flush with the other side of the member while fixedly secured thereto, said plug carrying only a proportional share of the load between said member as determined by the relative areas of the member and the exposed surface of the plug.

5. In combination, a plurality of superimposed relatively movable plates disposed in rubbing contact with one another, a porous metal part passing through one of said plates and fixedly secured thereto by means of enlarged diameter portions at both ends thereof which prevent removal of the part from the plate, one of said enlarged diameter portions being substantially flush with the surface of the plate which is in rubbing contact with an adjacent plate, said porous metal part carrying only a proportional share of the compressive load between the plates as determined by the relative areas of exposed porous metal surface and plate surface.

EARL S. PATCH.